(12) United States Patent
Danev

(10) Patent No.: US 9,016,771 B2
(45) Date of Patent: Apr. 28, 2015

(54) MOUNTING PART FOR BODY ATTACHMENT PARTS IN THE AUTOMOTIVE FIELD, AND A MOUNTING ARRANGEMENT HAVING A MOUNTING PART OF SAID TYPE

(71) Applicant: Dr. Ing. h.c. F. Porsche Aktiengesellschaft, Stuttgart (DE)

(72) Inventor: Dimitar Danev, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/057,274

(22) Filed: Oct. 18, 2013

(65) Prior Publication Data

US 2014/0110973 A1 Apr. 24, 2014

(30) Foreign Application Priority Data

Oct. 18, 2012 (DE) .......................... 10 2012 109 951

(51) Int. Cl.
- *B60N 99/00* (2006.01)
- *B62D 25/08* (2006.01)
- *B60K 11/08* (2006.01)

(52) U.S. Cl.
CPC .............. *B62D 25/082* (2013.01); *B60K 11/08* (2013.01)

(58) Field of Classification Search
USPC ............... 296/193.01, 193.05, 193.09, 193.1, 296/193.08
See application file for complete search history.

(56) References Cited

U.S. PATENT DOCUMENTS

| | | | |
|---|---|---|---|
| 7,108,092 B2 | 9/2006 | Suwa et al. | |
| 7,644,979 B2 * | 1/2010 | Bauernfeind | 296/193.09 |
| 7,766,111 B2 * | 8/2010 | Guilfoyle et al. | 180/68.1 |
| 8,172,307 B2 | 5/2012 | Froeschle et al. | |
| 8,191,959 B2 * | 6/2012 | Ritz | 296/187.09 |
| 2009/0256397 A1 * | 10/2009 | Bauernfeind | 296/193.1 |
| 2011/0181075 A1 * | 7/2011 | Glickman | 296/193.09 |
| 2011/0241378 A1 * | 10/2011 | Steller | 296/187.09 |

FOREIGN PATENT DOCUMENTS

| | | |
|---|---|---|
| DE | 43 07 793 | 9/1994 |
| DE | 196 30 899 | 11/1997 |
| DE | 10 2006 015 399 | 10/2007 |
| FR | 2 655 605 | 6/1991 |
| GB | 1 041 130 | 9/1966 |

OTHER PUBLICATIONS

German Search Report of Apr. 30, 2013.

\* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A mounting part is provided for body attachment parts (6, 8, 9, 10) in the automotive field, such as paneling elements, lamp casings for lamp units, etc. The mounting part has at least one first, body-side fastening arrangement (22) and at least one second, attachment-part-side fastening arrangement (26, 28). At least one flow cross section (30) is provided for fluidically connecting the atmosphere to a cooling device (11).

18 Claims, 3 Drawing Sheets ion, the mounting part 13 has fins 32
MOUNTING PART FOR BODY ATTACHMENT PARTS IN THE AUTOMOTIVE FIELD, AND A MOUNTING ARRANGEMENT HAVING A MOUNTING PART OF SAID TYPE

CROSS REFERENCE TO RELATED APPLICATION

This application claims priority under 35 USC 119 to German Patent Appl. No. 10 2012 109 951.0 filed on Oct. 18, 2012, the entire disclosure of which is incorporated herein by reference.

BACKGROUND

1. Field of the Invention

The invention relates to a mounting part for body attachment parts in the automotive field, such as for example paneling elements, lamp casings for lamp units, etc., having at least one first, body-side fastening arrangement and having at least one second, attachment-part-side fastening arrangement. The invention also relates to a mounting arrangement having a mounting part of said type.

2. Description of the Related Art

Mounting parts or mounting arrangements for mounting an attachment to a body are well known in the automotive field. For example, DE 10 2006 015 399 A1 discloses a mounting part that is intended to simplify the design measures and assembly outlay required for fastening body attachment parts, such as for example paneling parts or lamp casings. Unfortunately, however, the known mounting parts have the disadvantage that, with ever more complex structural space concepts, they take up too much free space and thus oppose flexible utilization of the structural space.

It is therefore an object of the invention to provide a mounting part and a mounting arrangement that eliminate the disadvantage mentioned above.

SUMMARY OF THE INVENTION

The invention relates to a mounting part with at least one flow cross section for fluidically connecting the atmosphere to a cooling device. In this way, the mounting part performs the mounting functions for body attachment parts and also the function of flow guidance. Thus, the structural space taken up by the mounting part is utilized in an optimum manner. Sealing elements advantageously are provided for a fluid-tight connection to a body attachment part and/or to the cooling device. In this way, the mounting part is connected to the respective connected part in an accurately fitting manner. The mounting part may provide flow-guiding surfaces to ensure efficient flow guidance. Furthermore, fins may be provided in the flow cross section. The fins improve flow through the mounting part and significantly increase the rigidity of the mounting part.

The mounting part may be formed in one piece and produced from plastic. The fastening arrangement may have at least one receiving slot that can be placed in operative connection with corresponding web-like extension pieces of the body attachment parts.

The invention also relates to a mounting arrangement having the above-described mounting part and a flow grille is provided such that the cooling device is fluidically connected to the atmosphere. The cooling device is particularly advantageously in the form of a charge-air cooler that may be arranged, for example, in the rear end of a motor vehicle, where installation space may be limited.

The mounting arrangement may comprise a fender paneling part below the flow grille. Further body attachment parts may comprise lamp casings and a faceplate part above the flow grille. The body attachment parts advantageously have at least one web-like projection that engages into the corresponding receiving slot of the mounting part.

The invention will be explained in more detail below on the basis of the drawings.

DETAILED DESCRIPTION OF THE PREFERRED EMBODIMENTS

Figure 1:
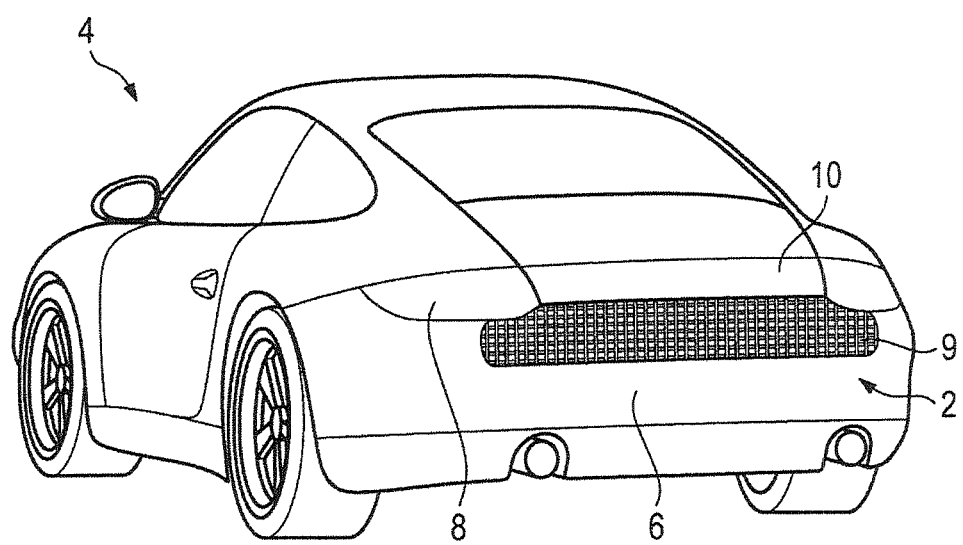
FIG. 1 is a perspective view of a rear-end region of a motor vehicle.

FIG. 1 is a perspective view of a rear-end region 2 of a motor vehicle 4. The rear-end region 2 has different body attachment parts, such as a fender paneling part 6, a lamp casing 8, a flow grille 9 and a faceplate part 10. The lamp casing 8 and the faceplate part 10 are arranged above the flow grille 9, and the fender paneling part 6 is arranged below the flow grille 9.

Figure 2:
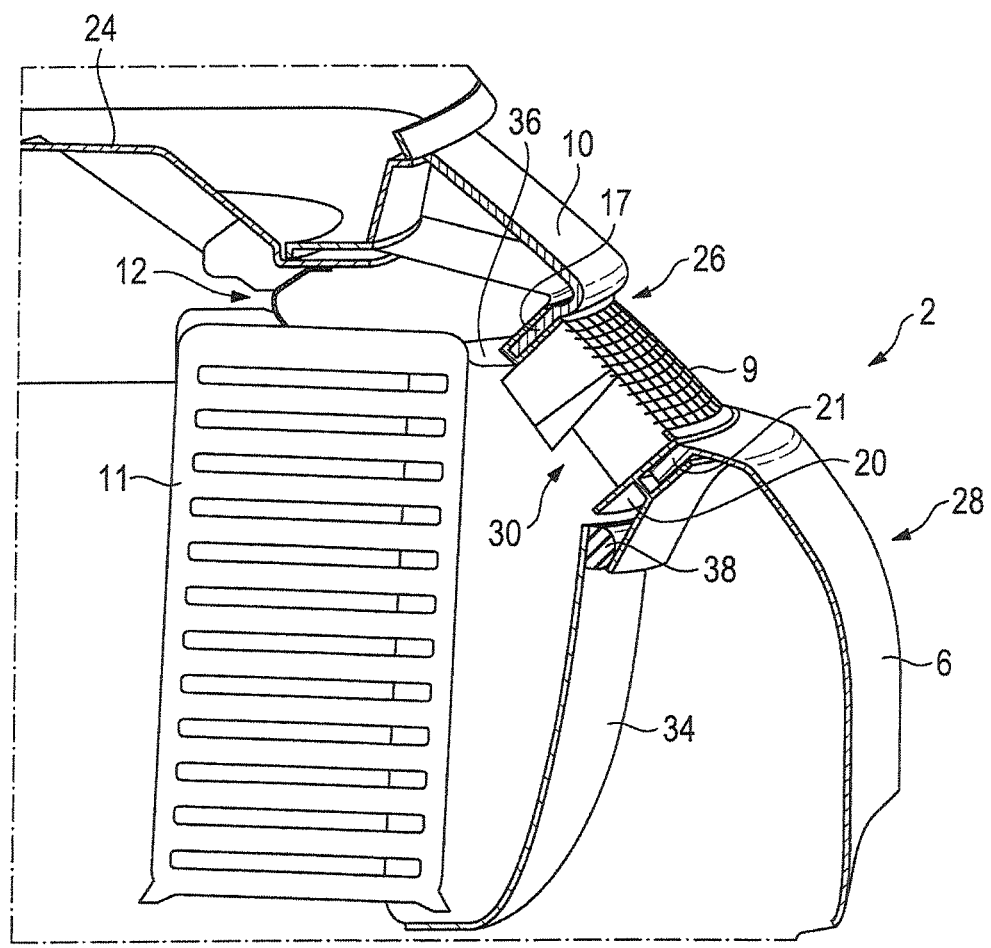
FIG. 2 is a sectional view through the rear end from FIG. 1.
Figure 3:
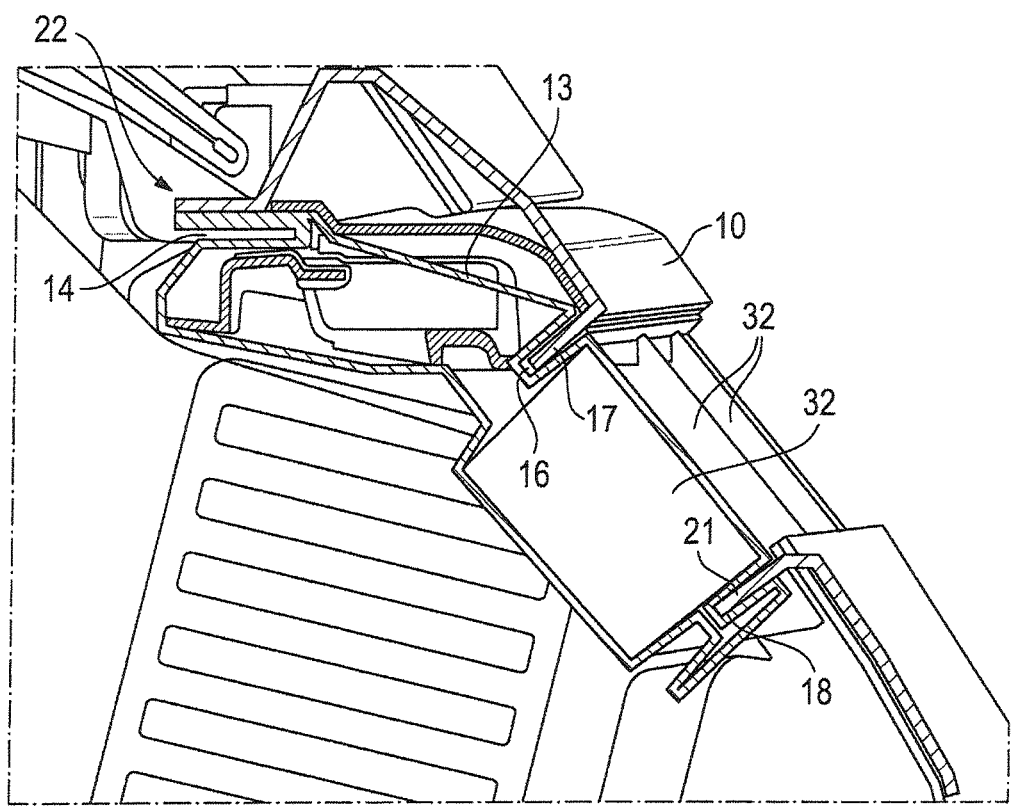
FIG. 3 is a partial detail view of the mounting part in the installation situation of FIG. 2.

FIG. 2 is a sectional view through the rear end 2 of the motor vehicle 4 of FIG. 1, and will be explained below with reference to FIG. 3. The motor vehicle 4 has a drive engine (not illustrated) in the rear end 2. The drive engine is connected operatively in a known way to a supercharging device and to a cooling device in the form of a charge-air cooler 11 that is connected to the supercharging device. The disposition of the drive engine with charge-air cooler 11 in the rear end 2 complicates installation space requirements. To utilize the installation space optimally, a mounting arrangement 12 is provided and has a mounting part 13 with body attachment parts 6, 8, 9, 10 connected thereto. The mounting part 13 is illustrated in most clearly in FIG. 3.

The mounting part 13 has multiple receiving slots 14, 16, 18, 20 that are assigned different functions. The receiving slot 14 is part of a first, body-side fastening arrangement 22 that connects the mounting part 13, and the attachment parts 6, 8, 9, 10 connected thereon to a body 24 of the motor vehicle.

The receiving slot 16 is part of an attachment-part-side, second fastening arrangement 26 and receives the faceplate 10 by way of a web-like projection 17 and the lamp casing 8 by way of a web-like projection. The receiving slot 18 is part of a further attachment-part-side, third fastening arrangement 28 and receives a web-like projection 21 of the fender paneling part 6. It should be clear that the body attachment parts 6, 8, 10 mentioned by way of example are fixed in a non-positively locking and/or positively locking manner to the vehicle 4 after being inserted into the respective receiving slot 16, 18.

The mounting part 13 has a flow cross section 30 that functions for fluidic connection of the charge-air cooler 11 to the atmosphere. In the present exemplary embodiment, to form the flow cross sect that function simultaneously as a reinforcement for the mounting part 13.

In the present exemplary embodiment, the charge-air cooler 11 has flow-guiding surfaces 34, 36 that bear sealingly against the mounting part 13. This is shown by way of example for the flow-guiding surface 34 where the end directed toward the mounting part 13 has a sealing element 38 that rests sealingly in a further receiving slot 20. As illustrated in FIG. 2, the flow grille 9 is clipped to the fins 32 of the mounting part 13.

The mounting arrangement of the invention with the mounting part 13 ensures in a particularly simple manner that the air exiting the charge-air cooler 11 is discharged into the atmosphere via the flow cross section 30 of the mounting part 13 and the flow grille 9. It should also be clear that the body attachment parts, and in this case, the faceplate part 10 and the flow grille 9, are not subject to any restrictions with regard to form and color.

What is claimed is:

1. A mounting arrangement for a motor vehicle that has at least one flow cross section for fluidically connecting the atmosphere to a cooling device, the mounting arrangement comprising:
   a mounting part having at least one body-side fastening arrangement; and
   body attachment parts arranged on the mounting part, each of the body attachment parts having at least one attachment-part-side fastening arrangement, the body attachment parts comprising:
      a flow grille configured to connect the cooling device fluidically to the atmosphere, and
      a fender paneling part provided below the flow grille.

2. The mounting arrangement of claim 1, further comprising sealing elements for a fluid-tight connection to at least one of the body attachment part and the cooling device.

3. The mounting arrangement of claim 1, wherein the cooling device comprises flow-guiding surfaces.

4. The mounting arrangement of claim 1, further comprising fins in the flow cross section.

5. The mounting arrangement of claim 1, wherein the mounting part is formed in one piece and is produced from plastic.

6. The mounting arrangement of claim 1, wherein the fastening arrangements have at least one receiving slot.

7. A mounting arrangement for a motor vehicle that has at least one flow cross section for fluidically connecting the atmosphere to a cooling device, the mounting arrangement comprising:
   a mounting part having at least one body-side fastening arrangement; and
   body attachment parts arranged on the mounting part, each of the body attachment parts having at least one attachment-part-side fastening arrangement, the body attachment parts comprising:
      a flow grille configured to connect the cooling device fluidically to the atmosphere, and
      lamp casings and a faceplate part provided above the flow grille.

8. The mounting arrangement of claim 7, wherein the cooling device is a charge-air cooler.

9. The mounting arrangement of claim 7, wherein the at least one body attachment part further comprises a fender paneling part provided below the flow grille.

10. A mounting arrangement for a motor vehicle that has at least one flow cross section for fluidically connecting the atmosphere to a cooling device, the mounting arrangement comprising:
    a mounting part having at least one body-side fastening arrangement with at least one receiving slot, and
    at least one body attachment part arranged on the mounting part, the at least one body attachment part comprising a flow grille configured to connect the cooling device fluidically to the atmosphere, the at least one body attachment parts having at least one web-like projection that engages into the corresponding receiving slot of the mounting part.

11. The mounting arrangement of claim 10, wherein the at least one body attachment part further comprises lamp casings and a faceplate part provided above the flow grille.

12. The mounting arrangement of claim 10, wherein the cooling device has flow-guiding surfaces.

13. The mounting arrangement of claim 10, further comprising fins in the flow cross section, the fins being configured for guiding an air flow and reinforcing the mounting part.

14. The mounting arrangement of claim 7, wherein at least one of the fastening arrangements comprises a receiving slot.

15. The mounting arrangement of claim 12, further comprising sealing elements providing a fluid-tight connection between the body attachments part and the flow guiding surfaces.

16. The mounting arrangement of claim 7, wherein the mounting part further includes fins in the flow cross section, the fins reinforcing the mounting part.

17. The mounting arrangement of claim 10, wherein the mounting part is of unitary construction.

18. The mounting arrangement of claim 10, wherein the at least one body attachments part further comprises at least one of a fender paneling part, a lamp casing and a faceplate part.

\* \* \* \* \*